United States Patent [19]

McCullough et al.

[11] 3,975,178

[45] Aug. 17, 1976

[54] PURIFICATION OF WET-PROCESS PHOSPHORIC ACID WITH METHANOL AND AMMONIA

[75] Inventors: John F. McCullough; Leland L. Frederick, both of Florence, Ala.

[73] Assignee: Tennessee Valley Authority, Muscle Shoals, Ala.

[22] Filed: May 28, 1974

[21] Appl. No.: 473,947

Related U.S. Application Data

[63] Continuation of Ser. No. 406,103, Oct. 12, 1973.

[52] U.S. Cl. .................................. 71/34; 423/321 S
[51] Int. Cl.² ......................................... C05B 7/00
[58] Field of Search ............... 423/319, 321, 321 S, 423/317; 71/34, 41, 43, 51

[56] References Cited
UNITED STATES PATENTS

| | | | |
|---|---|---|---|
| 3,479,139 | 11/1969 | Koerner | 423/321 |
| 3,635,669 | 1/1972 | Rubin | 423/319 |
| 3,663,168 | 5/1972 | Rubin et al. | 423/321 |
| 3,764,657 | 10/1973 | Frankenfeld | 423/321 |

FOREIGN PATENTS OR APPLICATIONS

| | | | |
|---|---|---|---|
| 1,518,774 | 1969 | France | 423/321 |
| 464,370 | 1937 | United Kingdom | 423/321 |

*Primary Examiner*—Earl C. Thomas
*Assistant Examiner*—Eugene T. Wheelock
*Attorney, Agent, or Firm*—Robert A. Petrusek

[57] ABSTRACT

Our invention relates to an improved process for the partial purification of wet-process phosphoric acid with co-production of impure phosphoric acid or solid fertilizer materials containing most of the impurities originally present in the crude acid. The crude acid is treated with methanol and ammonia to precipitate most of the metallic and fluorine impurities as solid ammonium metallic phosphates and fluorine compounds that filter and settle rapidly. The solids are separated from the reaction mixture and methanol is distilled from the resulting clarified solution to form concentrated partially purified acid. The solid ammonium metallic phosphates are fertilizer materials. Alternately, the reaction slurry is separated into a clarified liquid fraction and a settled slurry fraction. Methanol is distilled from the settled fraction which causes most of the impurities to redissolve yielding an impure phosphoric acid.

7 Claims, 3 Drawing Figures

PURIFICATION OF WET-PROCESS PHOSPHORIC ACID WITH METHANOL AND AMMONIA

This application is a continuation of our copending application Ser. No. 406,103, filed Oct. 12, 1973, for Purification of Wet-Process Phosphoric Acid With Methanol and Ammonia.

DETAILED DESCRIPTION OF THE INVENTION

Our invention relates to an improved process for the purification of wet-process phosphoric acid wherein the crude acid is mixed with methanol and a compound of ammonia to precipitate most of the metallic and fluorine impurities as solid ammonium metallic phosphates and fluorine compounds. Under the conditions of our process, the solids are precipitated in a form that settles and filters rapidly thus permitting conventional equipment to be used to separate the solids from the solution or to separate the reaction mixture into a clarified liquid fraction and a concentrated slurry fraction.

The process can be operated either continuously or batchwise; however, continuous operation gives reaction slurries that filter and settle more rapidly.

Methanol alone does not precipitate impurities from wet-process phosphoric acid but when a sufficient amount of ammonium ions are also present, most of the metallic and fluorine impurities are precipitated. The source of ammonium ions can be any ammonia compound that is soluble in the acid; however, anhydrous ammonia is preferred because no contaminating anions are introduced and the ammonia can be conveniently metered with simple, inexpensive equipment.

Generally the degree of purification increases with increase in both ammonia and methanol. However, the effectiveness of additional ammonia and methanol becomes progressively less as the degree of purification approaches 100 percent. Within limits, the same degree of purification can be obtained with relatively large amounts of ammonia and small amounts of methanol as with relatively small amounts of ammonia and large amounts of methanol. It is desirable, however, to use the least amount of methanol that is consistent with good purification and rapid filtration of the slurry because the most costly phase of the process is the distillation of methanol from the purified acid. On the other hand, large amounts of ammonia are also undesirable because too much of the acid is neutralized, monoammonium phosphate is co-precipitated, and, as later shown, filtration rates are low.

It was found that, although some precipitation of impurities occurs with lower amounts of ammonia and methanol, the optimum ranges of ammonia and methanol to give adequate to excellent removal of impurities as easily filtered solids are from 0.26 to 0.40 moles of ammonia per mole of $P_2O_5$ in the crude wet-process phosphoric acid and from 2.5 to 4.2 pounds of methanol per pound of $P_2O_5$ in such acid. By adequate removal of impurities is meant the removal of more than 50 percent of the iron, aluminum and fluorine—the quality of solution and suspension fertilizers prepared from such acid would be significantly upgraded. By excellent removal is meant the removal of 95 percent or more of the iron and aluminum and 90 percent or more of the fluorine.

The amounts of impurities remaining with different commercial wet-process phosphoric acids after treatment with the extremes of the above said optimum ranges of ammonia and methanol and with an intermediate level of ammonia and methanol are shown in Table I infra. Although somewhat different results were obtained for each acid, more than 50 percent of the iron, aluminum and fluorine were removed from each acid at the lower limits of ammonia and methanol and generally more than 95 percent was removed at the upper limits. There was a marked difference in the removal of magnesium from different acids. It was found that the fraction of magnesium removed increases with increase in ratio F:Mg and that magnesium was not effectively removed from acids having an exceptionally low ratio F:Mg.

The fraction of $P_2O_5$ precipitated with the impurities naturally depends upon factors such as: (1) the fraction of impurities precipitated, (2) the amount of impurities in the acid, and (3) the composition of the precipitated solids. Within the optimum ranges of ammonia and methanol given above, about 7 to 14 percent of the $P_2O_5$ was precipitated from the 10 different acids tested.

From 55 to 75 percent of the input ammonia remains with the purified acid; however, the nitrogen values are recovered because the acid will be converted to fertilizers.

The impurities are precipitated as complex ammonium metallic phosphates and fluorine compounds. Examination of the precipitates by x-ray diffraction showed that they were amorphous although some precipitates formed with relatively large amounts of ammonia and methanol contained small amounts of crystalline monoammonium phosphate. The compositions of the precipitates were variable and depended upon the precipitation conditions and upon the composition of the crude acid. When precipitated within the optimum ranges of ammonia and methanol, their nitrogen content ranged from 4 to 7 percent and their $P_2O_5$ content ranged from 44 to 54 percent. Generally, precipitates with the larger $P_2O_5$ contents were formed from acids that were unusually low in fluorine. Substantially all of the $P_2O_5$ was available and about 50 percent was water soluble by official AOAC procedures. Thus, the precipitates are fertilizer materials.

Study of batchwise precipitations showed that the impurities are initially precipitated as finely dispersed solids that filter very slowly and do not settle. It was discovered that digestion of the solids at temperatures from 35°C to the reflux temperature caused the solids to coagulate so that they then settled and filtered easily. The ease of filtration and the rate of settling increased with increase in digestion time and temperature.

It was found that continuous precipitation of the impurities gave slurries with substantially improved settling and filtration characteristics. As with batch precipitations, the filtration and settling rates generally increased with increase in residence time and increase in temperature and retentions of at least 13 minutes and temperatures of at least 35°C were required to form slurries that filtered at rates practical for an industrial process. Although the rate of filtration continues to increase with increase in residence time, the rate of increase becomes progressively smaller at retentions above 50 minutes and there is little advantage to extending the residence time beyond 90 minutes. Filtration continues to improve with rise in temperature up to the boiling point; however, the rate of improvement becomes progressively smaller at temperatures above 55°C. The upper limit of temperature is set by the boiling point of the reaction mixture which is around 70°C—the exact boiling point depends upon the composition.

It was further discovered that the maximum rates of filtration and settling occurs at mole ratio $NH_3:P_2O_5$ of about 0.3 and at weight ratio $CH_3OH:P_2O_5$ of about 2.8—the exact values of the ratios vary slightly from acid to acid. The effect of different amounts of ammonia and methanol on filtration rates of reaction slurries formed from the same acid by a continuous process that was operated at 60°C with a residence time of 50 minutes is shown in FIG. 2. (The filtration tests were made at 60°C and 15 inches of Hg using 400 mesh Saran filter cloth.) As shown by FIG. 2, filtration rates decrease with increase in both ammonia and methanol and range from high values at mole ratio $NH_3:P_2O_5$ of 0.30 and weight ratio $CH_3OH:P_2O_5$ of 2.9 to relatively low values at mole ratio $NH_3:P_2O_5$ of 4.2 and weight ratio $CH_3OH:P_2O_5$ of 4.5.

Settling rates parallel filtration rates, i.e., slurries that filter rapidly also settle rapidly. The effect of ammonia and methanol contents on settling of the reaction slurries of FIG. 2 is shown in FIG. 3. (The settling data were obtained by recording settled volumes at intervals in a 50 ml. graduate.) As shown by FIG. 3, the fastest settling slurries reached their final settled volume of about 11 percent within 5 minutes.

From the above discussion, it is seen that the maximum filtration and settling rates do not occur with ammonia and methanol contents that give maximum purification. Therefore, in practice of the process, a compromise is reached between rate of filtration and degree of purification. The compromise, naturally, is based on economic factors and on the desired level of purification.

In several embodiments of our process, advantage is taken of the favorable settling properties of the reaction mixtures to separate the reaction mixtures into clarified liquids fraction and concentrated slurries fraction by either gravity settling or by use of a sedimentation centrifuge. The concentrated slurry fraction can either be filtered or it can be processed without filtration. By incorporating the settling step into the process only the concentrated slurry need be filtered which appreciably reduces the size of the filter.

The concentrated slurry is processed without filtration by two methods. In one method, the methanol is evaporated, which causes most of the solids to redissolve to produce an impure phosphoric acid. This acid, either alone or when blended with wet-process acid, is suitable for the production of solid fertilizers in which the presence of the impurities has no deleterious effect. This method has the advantage of eliminating all filtration steps.

In the other method of treating the concentrated slurry, the acid is neutralized with ammonia to form crystalline ammonium phosphate and the resulting solids are freed of methanol and water either by filtration or evaporation. The resulting dry, nonhygroscopic solids consist primarily of a mixture of ammonium metallic phosphates and ammonium phosphates and hence are fertilizer materials. The method has the advantage of utilizing the heat of ammoniation to aid in the evaporation of methanol and water.

It was found that the order of addition of ammonia and methanol to the acid did not affect the final results. Thus, the acid can be ammoniated before the methanol is added; the methanol can be added to the acid before the ammonia is added; a solution of ammonia in methanol can be added; or separate streams of ammonia and methanol can simultaneously be added to the acid.

Table I

| Raw Acid No. | Raw Acid Wt.% $P_2O_5$ | Raw acid Fe | Raw acid Al | Raw acid Mg | Raw acid F | Treated Acid Fe $L^1$ | Treated Acid Fe $M^2$ | Treated Acid Fe $H^3$ | Treated Acid Al $L^1$ | Treated Acid Al $M^2$ | Treated Acid Al $H^3$ | Treated Acid Mg $L^1$ | Treated Acid Mg $M^2$ | Treated Acid Mg $H^3$ | Treated Acid F $L^1$ | Treated Acid F $M^2$ | Treated Acid F $H^3$ |
|---|---|---|---|---|---|---|---|---|---|---|---|---|---|---|---|---|---|
| | | | | | | | | Batch Precipitation | | | | | | | | | |
| 1 | 54.1 | 20.3 | 13.3 | 3.33 | 16.6 | 2.6 | 1.3 | <0.5 | 2.0 | 0.8 | 0.3 | 0.5 | 0.4 | 0.4 | 1.7 | 1.3 | 1.0 |
| 2 | 54.4 | 25.7 | 9.93 | 4.04 | 14.7 | — | — | <0.5 | — | — | <0.3 | — | — | <1.8 | — | — | <1.3 |
| 3 | 54.0 | 13.3 | 18.5 | 10.2 | 18.5 | — | — | <2.0 | — | — | <0.8 | — | — | — | — | — | <1.1 |
| 4 | 54.6 | 16.7 | 16.5 | 6.95 | 16.5 | — | — | <0.8 | — | — | <1.1 | — | — | <3.0 | — | — | <0.6 |
| 5 | 52.8 | 19.7 | 7.20 | 11.6 | 11.6 | — | 7.3 | 5.9 | 0.8 | 0.6 | 0.3 | 8.9 | 8.6 | 8.0 | 1.7 | 1.6 | 1.0 |
| 6 | 54.2 | 12.9 | 8.86 | 5.16 | 3.32 | | — | <1.0 | — | — | <1.0 | — | — | 4.0 | — | — | 0.2 |
| | | | | | | | | Continuous precipitation | | | | | | | | | |
| 7 | 52.8 | 17.0 | 10.2 | 3.10 | 11.4 | 8.2 | 6.1 | <0.5 | 2.7 | 2.0 | 0.1 | 2.0 | 1.8 | 1.7 | 1.7 | 1.4 | 0.9 |
| 8 | 53.5 | 16.8 | 9.25 | 3.94 | 14.9 | 7.5 | 6.5 | 1.1 | 2.7 | 2.2 | <0.1 | 1.6 | 1.6 | 1.4 | 2.6 | 2.0 | <0.5 |
| 9 | 55.0 | 15.4 | 11.8 | 3.64 | 15.4 | 4.2 | 3.6 | 0.8 | 2.1 | 1.7 | 0.4 | 1.7 | 1.7 | 1.7 | 2.2 | 2.1 | 1.4 |
| 10 | 53.0 | 15.9 | 6.93 | 1.98 | 5.85 | 4.5 | 3.1 | 0.6 | 1.7 | 1.3 | 0.2 | 1.8 | 1.3 | 0.9 | 1.7 | 1.3 | 1.2 |

[1]Treated with 0.26 moles of $NH_3$ per mole of $P_2O_5$ and 2.48 pounds of $CH_3OH$ per pound of $P_2O_5$.
[2]Treated with 0.30 moles of $NH_3$ per mole of $P_2O_5$ and 2.76 pounds of $CH_3OH$ per pound of $P_2O_5$.
[3]Treated with 0.40 moles of $NH_3$ per mole of $P_2O_5$ and 4.14 pounds of $CH_3OH$ per pound of $P_2O_5$.

Broad Limiting Definition of the Invention

Our invention is an improved method for the partial purification of wet-process phosphoric acid containing from 50 to 55 percent $P_2O_5$, with co-production of solid fertilizer materials or impure phosphoric acid containing most of the metallic and fluorine impurities originally present in the crude acid, which comprises mixing the crude acid with methanol and compounds of ammonia while maintaining the temperature of the reaction mixture from 35°C to its boiling point for a period in the range from 15 to 90 minutes, wherein for each mole of $P_2O_5$ in the crude acid the moles of ammonia are in the range from 0.26 to 0.4 and for each pound of $P_2O_5$ in the crude acid, the amount of methanol is in the range from 2.5 to 4.2 pounds and wherein said ammonia is supplied from the group consisting of ammonium salts, aqueous ammonia and anhydrous ammonia; physically separating the resulting reaction mixture into a clarified liquid fraction of aqueous phosphoric acid and ammonium phosphate free of most of the metallic and fluorine impurities originally present in the crude acid dissolved in methanol and a fraction of either solids or of concentrated slurry which contain most of the metallic and fluorine impurities originally present in the crude acid.

In one treatment of the clarified liquid fraction, substantially all of the methanol and part of the water is distilled from the liquid leaving a residue of concentrated, partially purified phosphoric acid. In an alternate treatment of the clarified liquid fraction, ammonia sufficient to neutralize the acid is added which results in precipitation of ammonium phosphate and the precipitate is recovered by filtration.

Several options are possible for treatment of the solid or concentrated slurry fractions separated from the reaction mixture. One treatment consists of washing the solids with methanol to remove mother liquor and then removing the methanol from the washed solids to form a dry, nonhygroscopic fertilizer material. This treatment has the advantage of giving maximum yield of purified acid.

In another treatment of the solid fraction, sufficient ammonia is added to neutralize the acid contained in the mother liquor adhering to the solids and then the solids are dried to remove methanol and water, thus forming a dry, nonhygroscopic fertilizer material containing a small amount of ammonium phosphate. This treatment has the advantage of eliminating the washing step and utilizing the heat of ammoniation to aid in the drying step.

When a concentrated slurry fraction is separated, one method of treatment is to distill the methanol from the slurry thus causing most of the solids to redissolve to form a concentrated, impure phosphoric acid. This method has the advantage of eliminating all filtration steps.

Another treatment of the concentrated slurry is to add sufficient ammonia to neutralize the acid and cause precipitation of dissolved phosphate as ammonium phosphate. The solids are then separated from the methanol and water by filtration. The dried solids are nonhygroscopic fertilizer material consisting of a mixture of ammonium metallic phosphates and ammonium phosphate. This treatment has the advantage of eliminating the distillation of methanol from the concentrated slurry.

It was surprisingly found that, under the conditions of our process, most of the metallic and fluorine impurities in the crude acid are precipitated as amorphous, complex ammonium metallic phosphates and fluorine compounds containing from 4 to 7 percent nitrogen and from 44 to 54 percent $P_2O_5$, all of which is available and about 50 percent is water soluble by official AOAC procedures. Thus, the precipitates are fertilizer materials. Furthermore, the amorphous solids form agglomerates that settle and filter rapidly in contrast to the material precipitated by the method of British Pat. No. 464,370 that is described as an oily, slimy, viscous mass that is slowly deposited.

It was further found that when methanol is used as the precipitating agent considerably more ammonia is required for effective purification than is required in the process described in German Pat. No. 2,050,008, which used isopropanol in amounts about twice that of methanol in the present process. Our use of more ammonia is of little economic significance because the purified acid will be mainly used for the preparation of fertilizers in which the nitrogen values will be recovered. Our use of methanol in smaller amounts is, however, of great importance because the most costly part of the process is the distillation of methanol from the acid. Methanol is much cheaper than isopropanol and is more easily distilled from the acid because of its lower boiling point. Another important advantage of methanol over isopropanol is the fact that methanol does not form constant boiling mixtures with water as does isopropanol. This allows methanol to be completely separated from water by simple fractionation whereas isopropanol cannot be completely separated from water by simple fractionation—the constant boiling mixture at 760 mm and 80°C contains 12.1 weight percent water and 87.9 weight percent isopropanol.

PRIOR ART

Prior-art methods for purification of wet-process phosphoric acid with organic solvents have been described by numerous investigators (A. V. Slack, Phosphoric Acid, Part II, Marcel Dekker, Inc., New York, 1968, pp. 709–724). Most of these methods are solvent extraction processes where the acid is partitioned between an organic phase and the impure aqueous phase. Solvent extraction processes utilize solvents that are immiscible or only partly miscible with the aqueous acid such as aliphatic alcohols containing from 4 to 8 carbon atoms. There are always at least two liquid phases present in solvent extraction processes and the impurities are not removed from the crude acid as solids.

Prior-art methods for purification of wet-process phosphoric acid with alkali or ammonia compounds and water miscible organic solvents to effect precipitation of impurities are described in British Pat. No. 464,370 and in German Pat. No. 2,050,008.

The process described by the British patent depends upon the treatment of wet-process phosphoric acid with water miscible organic solvents in the presence of alkali or ammonia compounds to precipitate most of the metallic impurities. After separation of the precipitate from the solution, the solvent is distilled from the acid. Organic compounds specifically stated to be suitable were methanol, ethanol and acetone; however, 92 percent ethanol was used in all examples. Alkali or ammonia compounds named in the description are alkali and ammonia bases and salts of the following acids: sulfuric, phosphoric, oxalic, carbonic, and nitric. However, only potassium and sodium salts were used in the examples and from the description of the process and from the claims, it is clear that only potassium compounds were used in actual practice of the process. In the examples pertaining to acid purification from 0.14 to 0.46 moles of potassium or sodium per mole of $P_2O_5$ in the acid were used and the optimum range for practice of the process was stated to be from 0.2 to 0.3 moles of potassium or sodium per mole of $P_2O_5$ although it was stated that in some cases as little as 0.04 moles of potassium as KOH per mole of $P_2O_5$ gave excellent results. The amount of 92 percent ethanol used in the examples was twice the volume of aqueous acid and it is stated in the specifications that this amount of ethanol is generally sufficient.

The process gave excellent purification of the acid; the level of (Fe + Al + Ca) in the acid was reduced from 68 grams to from 0.4 to 1.0 grams per kilogram of $P_2O_5$. About 83 percent of the input acid remained with the ethanol solution.

Although the process gives excellent purification, it has never been used on industrial scale. The weakness of the process undoubtedly lies in the physical nature of the precipitate which is described as a slimy, oily, viscous mass which is slowly deposited. Such a material is very difficult to separate from the ethanolic acid solution and separation on an industrial scale would be impractical.

The process described in the German patent consists of treating wet-process phosphoric acid with a water miscible alcohol and ammonia compounds to precipitate most of the metallic impurities as an easily filtered solid. After removal of the solids, the alcohol is distilled from the purified acid. The amount of ammonia used in the treatment is restricted to 0.06 to 0.12 moles per mole of $P_2O_5$ in the acid. Although all water miscible alcohols are claimed to be effective in the treatment, only isopropanol was used in the examples. The effective amount of isopropanol was claimed to be from 2 to 5 parts per part of crude acid—with acid containing 54 percent $P_2O_5$, this is equivalent to from 3.7 to 9.2 pounds of isopropanol per pound of $P_2O_5$.

Several advantages of this process over that described in the British patent were stated to be as follows: (1) the precipitated impurities are obtained as a flocculent, easily filtered sediment that can be separated from the solution with known filtering devices, (2) only a slight $P_2O_5$ loss occurs (3 to 6%), and (3) the purified acid contains less alkali or ammonia.

Several methods for the preparation of substantially pure phosphoric acid from phosphate rock or monocalcium phosphate that use methanol have been published (U.S. Letters Pat. Nos. 3,663,168 and 3,635,669, and W. H. Thompson, Chem. Eng., April 5, 1971).

U.S. Pat. No. 3,663,168 describes a process wherein single or triple superphosphate is treated with methanol and stoichiometric amounts of sulfuric acid or ammonium bisulfate or mixtures thereof to convert the calcium phosphate to gypsum or to mixtures of gypsum and crystalline ammonium sulfate and a solution of phosphoric acid and methanol. After removal of the solids, distillation of the methanol from the solution yields phosphoric acid of high purity.

U.S. Pat. No. 3,635,669 describes a process wherein a solid mixture consisting of phosphoric acid, calcium sulfate, and ammonium sulfate prepared by treatment of phosphate rock with molten ammonium bisulfate is extracted with methanol to form a methanolic solution of phosphoric acid. Distillation of the methanol from the solution yields a residue of substantially pure phosphoric acid.

The process described by Thompson consists primarily of the acidulation of phosphate rock with aqueous potassium bisulfate to form gypsum and a solution of monopotassium phosphate in phosphoric acid. After separation of the gypsum, methanol is added to the solution to precipitate monopotassium phosphate. After the product monopotassium phosphate is separated, the methanol is distilled from the solution to yield a residue of high purity phosphoric acid.

Objects of the Invention

It is an object of the present invention to provide an improved process for the partial purification of wet-process phosphoric acid prepared by acidulation of phosphate rock with sulfuric acid. The partially purified acid is especially suitable for the production of high-quality solution and suspension fertilizers that do not deposit solids or form viscous gels during preparation, shipping and storage. Solution fertilizers prepared from crude wet-process phosphoric acids tend to deposit solid metallic phosphates and fluorine compounds of iron, aluminum, magnesium, and other metals present in the crude acid as impurities. These solids interfere with handling and distribution of the solutions. The metallic and fluorine impurities in suspension fertilizers prepared from wet-process phosphoric acid tend to form gels that markedly increase the viscosity and place upper limits on the practical concentrations.

Another advantage of partially purified phosphoric acid is that it can be highly concentrated to form superphosphoric acid of relatively low viscosity without the deposition of solids. Superphosphoric acid is more economical to ship and store than the usual 54 percent $P_2O_5$ wet-process phosphoric acid.

It is a further object of the instant invention to provide a process for the precipitation of most of the metallic and fluorine impurities from wet-process phosphoric acid as solids that filter and settle rapidly thus allowing the use of conventional processing equipment for separation of the solids from the solution. In addition, the rapid filtering and settling properties of the solids allows the solid-liquid separation equipment to be relatively small.

Another object of the invention is to precipitate the impurities as ammonium metallic phosphates and fluorine compounds that are fertilizer materials containing from 44 to 54 percent $P_2O_5$ and from 4 to 7 percent nitrogen.

Another object of the invention is to precipitate the impurities as solids that settle rapidly so that they can be separated from the bulk of the solution as a concentrated slurry. Distillation of the methanol from the concentrated slurry causes most of the solids to redissolve to form an impure phosphoric acid that is suitable for use in the preparation of solid fertilizers. Alternately, neutralization of the acid in the concentrated slurry with ammonia precipitates the dissolved phosphate as crystalline ammonium phosphate and separation of the resulting solids from the solution yields a solid fertilizer material consisting of a mixture of ammonium metallic phosphates and ammonium phosphate.

Another object of the invention is to effect precipitation of the impurities with methanol and ammonia compounds. Methanol has the advantage over all other solvents that are suitable for the purification of wet-process phosphoric acid by either solvent precipitation or by solvent extraction of being the cheapest. This is important because in all solvent purification methods, some solvent will be lost by reaction with the acid and/or by mechanical means. Other advantages or methanol are its low boiling point, its low latent heat of evaporation and the fact that it does not form constant boiling mixtures with water. These properties are important to the economics of separating the solvent from the acid by distillation and to the separation of methanol from water in a fractionation column.

The use of ammonium compounds to effect precipitation of impurities is advantageous because ammonium compounds are economical and the nitrogen values are recovered as plant nutrients in the final fertilizer products.

Explanation of the Flowsheet

FIGURE 1

Figure 1:
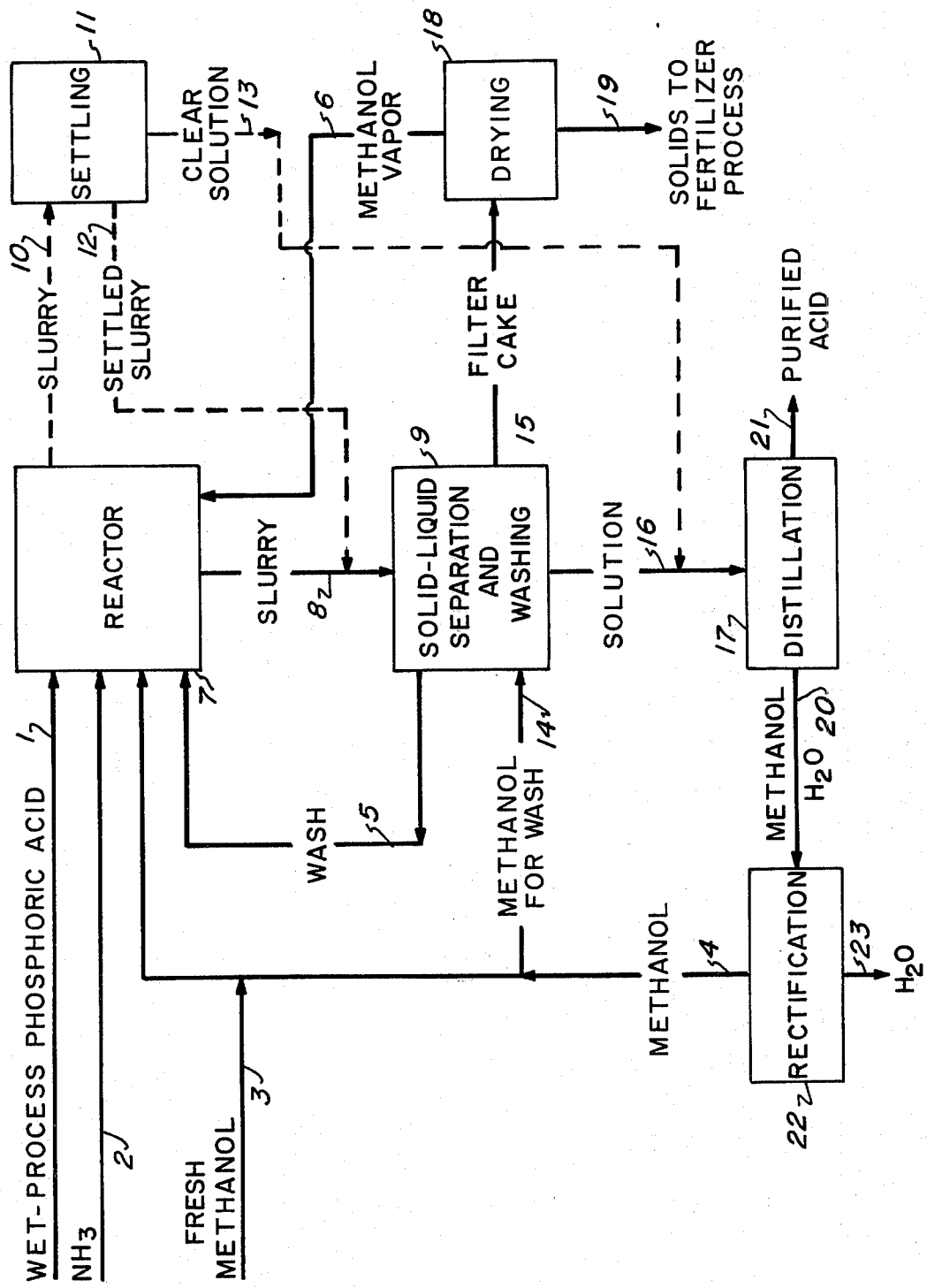
FIG. 1 shows a flow sheet of a preferred embodiment of the invention.

A preferred embodiment of the process of the present invention is illustrated in FIG. 1. Wet-process phosphoric acid containing 50 to 55 percent $P_2O_5$ and anhydrous ammonia are introduced into enclosed and stirred reactor 7 via lines 1 and 2, respectively. Fresh methanol (make-up) and recycle methanol are introduced into reactor 7 via lines 3 and 4, respectively. Methanol wash (containing small amounts of $H_3PO_4$ and water) and methanol vapors from drier 18 are introduced into reactor 7 via lines 5 and 6, respectively. The crude acid and the ammonia are metered in the proportions needed to maintain within reactor 7 the mole ratio $NH_3:P_2O_5$ of 0.26 to 0.40. The fresh methanol is metered at the rate needed to maintain within reactor 7 the weight ratio methanol:$P_2O_5$ between 2.5 and 4.2. The reaction mixture within reactor 7 is stirred while maintaining the temperature within the range 35°C to the boiling point of the reaction mixture. After a residence time from about 15 to about 90 minutes, the reaction mixture is withdrawn from reactor 7 via line 8 and delivered to solids separator 9. The clarified solution is withdrawn from the solids separator 9 via line 16 and delivered to distillation apparatus 17. After the solids are separated from the solution, they are washed with recycle methanol that is introduced via line 14. The wash solution is then delivered to reactor 7 via line 5. As an alternate practice, the reaction mixture is withdrawn from reactor 7 via line 10 are delivered to settling device 11. The clear supernatant solution is withdrawn from settling device 11 via line 13 and delivered to distillation apparatus 17. The settled slurry is withdrawn from settling device 11 via line 12 and delivered to solids separator 9. The washed solids are delivered via line 15 to drier 18. Methanol vapor from drier 18 is delivered via line 6 to reactor 7. The dried solids 19 contain most of the metallic and fluorine impurities present in the crude acid as ammonium metallic phosphates and fluorine compounds. The solids contain from 44 to 54 percent $P_2O_5$ and from 4 to 7 percent nitrogen. All of the $P_2O_5$ is available as plant nutrients by official AOAC procedures. Hence, the solids are fertilizer materials and thus are further processed into fertilizer products.

The clarified solution that is delivered via lines 16 and/or 13 to distillation apparatus 17 consists essentially of methanol, water, and phosphoric acid. The methanol and part of the water is distilled from the acid and the vapors are delivered to rectification column 22 via line 20 where the water and methanol are separated. The water via line 23 is discarded and the methanol via line 4 is recycled to the process. Part of the recycle methanol is delivered via line 14 to washing device 9.

The purified acid product 21 has a high $P_2O_5$ content generally of the order of 55 to 70 percent by weight depending upon the distillation practice.

Figure 2:
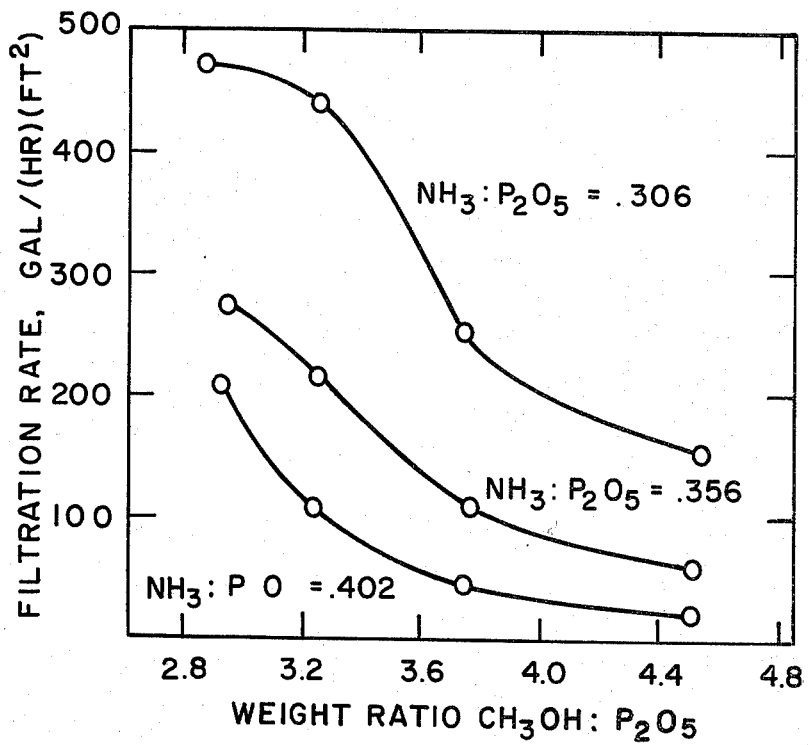
FIG. 2 shows the relationship between added ammonia and methanol versus the resulting filtration rate.
Figure 3:
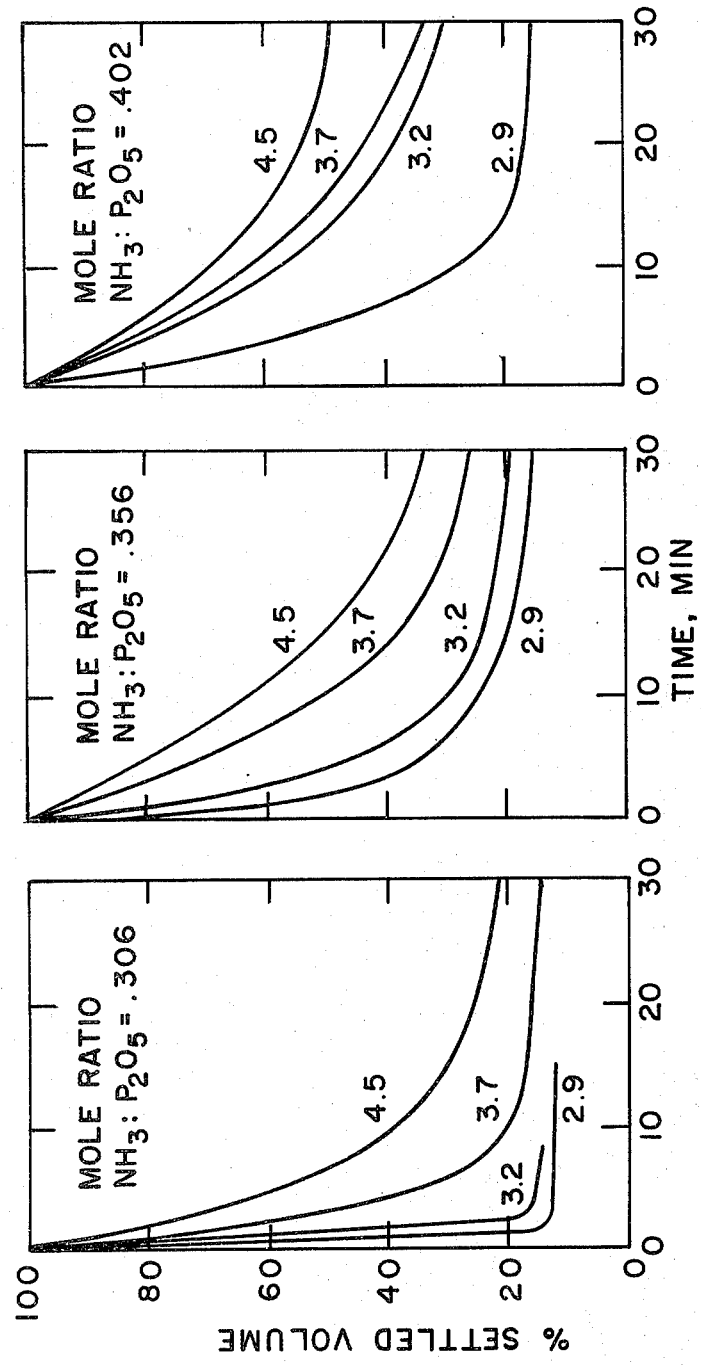
FIG. 3 shows the effect of added ammonia and methanol on the resulting settled contaminant volume.

For purposes of convenience to the reader, FIGS. 2 and 3 were previously discussed in detail in the latter part of this specification entitled "Detailed Description of the Invention."

In order that those skilled in the art may better understand how the present invention can be practiced, the following examples are given by way of illustration but not by way of limitation.

EXAMPLE I

Merchant grade wet-process phosphoric acid containing 53 percent by weight of $P_2O_5$ and having the following amounts of impurities was used in this example:

| Grams per kilogram $P_2O_5$ | | | | |
|---|---|---|---|---|
| Fe | Al | Mg | Ca | F |
| 15.9 | 6.93 | 1.98 | <0.9 | 5.85 |

7700 grams of the acid was reacted with 695 grams of ammonium bicarbonate to form an ammoniated feed stock containing 51 percent by weight of $P_2O_5$ and having the mole ratio $NH_3:P_2O_5$ of 0.306. 3.95 grams per minute of the ammoniated acid and 5.75 grams per minute of methanol were continuously fed into an enclosed and stirred reactor filled with previously prepared reaction mixture. This proportion of input materials maintained within the reactor the weight ratio methanol:$P_2O_5$ of 2.86. The temperature of the reaction mixture was maintained at 60°C and the residence time of the reaction mixture within the reactor was 32 minutes. Overflow from the reactor was collected in an enclosed and stirred sample collector which was maintained at a temperature of 60°C. After each successive period of 40 minutes, the contents of the sample collector were completely expelled so that the average residence time of the reaction mixture within the sample collector was 20 minutes. The total residence time of the reaction mixture at the reaction temperature of 60°C thus was 52 minutes.

After the process had operated for 191 minutes, the filtration rate of each successive sample of reaction mixture expelled from the sample collector was measured; weighed amounts containing about 290 grams of the reaction mixture were filtered at a temperature of 60°C and at 15 inches of Hg on a 4.52-in$^2$ filter equipped with 400 mesh Saran filter cloth. The average of 7 filtration measurements was 471 gal. per $(hr)(ft^2)$; the standard deviation was 43.8 gal/$(hr)(ft^2)$.

After the process had operated for 191 minutes, weighed analytical samples containing about 49 grams of reaction mixture from every other sample expelled from the sample collector were filtered and washed with 100 ml of methanol; the filter cakes were dried, then weighed and analyzed. It was found from four analytical samples that the average concentration of solids in the reaction mixtures was 3.44 percent by weight. Upon analysis it was found that the dry filter cakes had the following average weight percent composition:

| $P_2O_5$ | N | Fe | Al | Mg | F |
|---|---|---|---|---|---|
| 53.4 | 4.9 | 7.6 | 3.8 | 0.29 | 1.8 |

Analysis of the combined filtrates and washes from the four analytical samples showed that they contained the following average amounts of impurities:

| | Grams per kilogram $P_2O_5$ | | | |
|---|---|---|---|---|
| N | Fe | Al | Mg | F |
| 24 | 3.0 | 1.3 | 1.3 | 1.3 |

Based on the total recovery, the average percent of input components contained in the combined filtrates and washes are as follows:

| P₂O₅ | N | Fe | Al | Mg | F |
|---|---|---|---|---|---|
| 91.1 | 73 | 18 | 16 | 71 | 28 |

EXAMPLE II

The wet-process phosphoric acid used in Example I was also used in this example. 7500 grams of the acid was reacted with 788 grams of ammonium bicarbonate to form an ammoniated feed stock containing 50.6 percent by weight of P₂O₅ and having the mole ratio NH₃:P₂O₅ of 0.356. 3.08 grams per minute of the pre-ammoniated acid and 5.84 grams per minute of methanol were continuously fed into an enclosed and stirred reactor filled with previously prepared reaction mixture. This proportion of input materials maintained within the reactor the weight ratio methanol:P₂O₅ of 3.73. The temperature of the reaction mixture was maintained at 60°C and the residence time of the reaction mixture within the reactor was 28 minutes. Overflow from the reactor was collected in an enclosed and stirred sample collector which was maintained at a temperature of 60°C. After each successive period of 40 minutes, the contents of the sample collector were completely expelled so that the average residence time of the reaction mixture within the sample collector was 20 minutes. The total residence time of the reaction mixture at the reaction temperature of 60°C thus was 48 minutes.

After the process was operated for 191 minutes, the filtration rate of each successive sample of reaction mixture expelled from the sample collector was measured; weighed amounts containing about 290 grams of the reaction mixtures were filtered at a temperature of 60°C and at 15 inches of Hg on a 4.52-in² filter equipped with 400 mesh Saran filter cloth. The average of 7 filtration measurements was 111 gal/(hr)(ft²).

After the process was operated for 191 minutes, weighed analytical samples containing about 49 grams of reaction mixture from every other sample expelled from the sample collector were filtered and washed with 100 ml of methanol; the filter cakes were dried, then weighed and analyzed. It was found from 4 analytical samples that the average concentration of solids in the reaction mixtures was 3.41 percent by weight. Upon analysis it was found that the dry filter cakes had the following average weight percent composition;

| P₂O₅ | N | Fe | Al | Mg | F |
|---|---|---|---|---|---|
| 54.0 | 5.1 | 7.4 | 3.6 | 0.5 | 1.9 |

Analysis of the combined filtrates and washes from the four analytical samples showed that they contained the following average amounts of impurities:

| | Grams per kilogram P₂O₅ | | | |
|---|---|---|---|---|
| N | Fe | Al | Mg | F |
| 29 | 1.0 | 0.4 | 1.3 | 1.2 |

Based on the total recovery, the average percentage of input components contained in the combined filtrates and washes are as follows:

| P₂O₅ | N | Fe | Al | Mg | F |
|---|---|---|---|---|---|
| 89.5 | 68 | 6 | 5 | 54 | 32 |

EXAMPLE III

The wet-process phosphoric acid used in Example I was also used in this example. 7500 grams of the acid was reacted with 889 grams of ammonium bicarbonate to form a pre-ammoniated feed stock containing 50.3 percent by weight of P₂O₅ and having the mole ratio NH₃:P₂O₅ of 0.402, 2.85 grams per minute of the pre-ammoniated acid and 6.33 grams per minute of methanol were continuously fed into an enclosed and stirred reactor filled with previously prepared reaction mixture. This proportion of input materials maintained within the reactor the weight ratio methanol:P₂O₅ of 4.43. The temperature of the reaction mixture was maintained at 60°C and the residence time of the reaction mixture within the reactor was 28 minutes. Overflow from the reactor was collected in an enclosed and stirred sample collector which was maintained at a temperature of 60°C. After each successive period of 40 minutes, the contents of the sample collector were completely expelled so that the average residence time of the reaction mixture within the sample collector was 20 minutes. The total residence time of the reaction mixture at the reaction temperature of 60°C thus was 48 minutes.

After the process was operated for 191 minutes, the filtration rate of each successive sample of reaction mixture expelled from the sample collector was measured; weighed amounts containing about 290 grams of the reaction mixture were filtered at a temperature of 60°C and at 15 inches of Hg on a 4.52-in² filter equipped with 400 mesh Saran filter cloth. The average of 7 filtration measurements was 21 gal/(hr)(ft²); the standard deviation was 1.3 gal/(hr)(ft²).

After the process was operated for 191 minutes, weighed analytical samples containing about 49 grams of reaction mixture from every other sample expelled from the sample collector were filtered and washed with 100 ml of methanol; the filter cakes were dried, then weighed and analyzed. It was found from four analytical samples that the average concentration of solids in the reaction mixtures was 2.85 percent by weight. Upon analysis it was found that the dry filter cakes had the following average weight percent composition:

| P₂O₅ | N | Fe | Al | Mg | F |
|---|---|---|---|---|---|
| 50.4 | — | 8.2 | 4.3 | 0.62 | 2.7 |

Analysis of the combined filtrates and washes from the four analytical samples showed that they contained the following average amounts of impurities.

| | Grams per kilogram P₂O₅ | | | |
|---|---|---|---|---|
| N | Fe | Al | Mg | F |
| 32 | 0.6 | 0.2 | 0.9 | 1.1 |

Based on the total recovery, the average percent of input components contained in the combined filtrates and washes are as follows:

| $P_2O_5$ | N | Fe | Al | Mg | F |
|---|---|---|---|---|---|
| 90.8 | — | 3 | 2 | 42 | 17 |

EXAMPLE IV

Merchant grade wet-process acid containing 52.8 percent $P_2O_5$ and having the following amounts of impurities was used in this example:

| | Grams per kilogram $P_2O_5$ | | |
|---|---|---|---|
| Fe | Al | Mg | F |
| 17.0 | 10.2 | 3.10 | 11.4 |

10.7 grams per minute of acid, 14.5 grams per minute of methanol and 0.171 grams per minute of anhydrous ammonia were continuously fed into an enclosed and stirred reactor filled with previously prepared reaction mixture. These proportions of input materials maintained within the reactor the mole ratio $NH_3:P_2O_5$ of 0.25 and the weight ratio $CH_3OH:P_2O_5$ of 2.6. The temperature of the reaction mixture was maintained at 35°C and the residence time within the reactor was 32 minutes. Overflow from the reactor was collected in an enclosed and stirred sample collector which was maintained at a temperature of 35°C. After each successive period of 40 minutes, the contents of the sample collector were completely expelled so that the average residence time of the reaction mixture within the sample collector was 20 minutes. The total residence time of the reaction mixture at the reaction temperature of 35°C was 52 minutes. After the process was operated for 234 minutes, the filtration rate of 1020 grams of the reaction mixture was measured at a temperature of 35°C and at 15 inches of Hg on a 10.1-in² filter equipped with 400 mesh Saran filter cloth. The filtration rate was found to be 31 gal/(hr)(ft²). The filter cake was washed with 200 ml of methanol and upon drying was found to weigh 31.9 grams. Upon analysis the dry filter cake was found to have the following weight percent composition:

| $P_2O_5$ | N | Fe | Al | Mg | F |
|---|---|---|---|---|---|
| 46.9 | 5.8 | 6.0 | 4.9 | 1.0 | 6.4 |

Upon analysis the combined filtrate and wash was found to contain 208 grams of $P_2O_5$ and to contain the following amounts of impurities:

| | Grams per kilogram $P_2O_5$ | | | |
|---|---|---|---|---|
| N | Fe | Al | Mg | F |
| 17 | 7.3 | 2.4 | 1.9 | 1.5 |

Based on the total recovery the percent of input components contained in the combined filtrate and wash are as follows:

| $P_2O_5$ | N | Fe | Al | Mg | F |
|---|---|---|---|---|---|
| 93.3 | 67 | 44 | 25 | 56 | 12 |

EXAMPLE V

The acid used in this example is the same as that used in Example IV. 42.4 grams per minute of acid, 60.7 grams per minute of methanol and 0.711 grams per minute of anhydrous ammonia were continuously fed into an enclosed and stirred reactor filled with previously prepared reaction mixture. These proportions of input materials maintained within the reactor the mole ratio $NH_3:P_2O_5$ of 0.26 and the weight ratio methanol:-$P_2O_5$ of 2.7. The temperature of the reaction mixture was maintained at 55°C and the residence time within the reactor was 8 minutes. Overflow from the reactor was collected in an enclosed and stirred sample collector which was maintained at a temperature of 55°C. After each successive period of 10 minutes, the contents of the sample collector were completely expelled so that the average residence time of the reaction mixture within the sample collector was 5 minutes. The total residence time of the reaction mixture at the reaction temperature of 55°C thus was 13 minutes. After the process was operated for 58 minutes, the filtration rate of 1028 grams of the reaction mixture was measured at 55°C and at 15 inches of Hg on a 10.1-in² filter equipped with 400 mesh Saran filter cloth. The filtration rate was found to be 36 gal/(hr)(ft²). The filter cake was washed with 200 ml of methanol and upon drying was found to weigh 37.3 grams. Upon analysis the dry filter cake was found to have the following weight percent composition:

| $P_2O_5$ | N | Fe | Al | Mg | F |
|---|---|---|---|---|---|
| 46.9 | 5.2 | 6.8 | 5.0 | 1.1 | 6.5 |

Upon analysis the combined filtrate and wash was found to contain 219 grams of $P_2O_5$ and to contain the following amounts of impurities:

| | Grams per kilogram $P_2O_5$ | | | |
|---|---|---|---|---|
| N | Fe | Al | Mg | F |
| 19 | 6.0 | 1.6 | 1.7 | 1.6 |

Based on the total recovery, the percent of input components contained in the combined filtrate and wash are as follows:

| $P_2O_5$ | N | Fe | Al | Mg | F |
|---|---|---|---|---|---|
| 92 | 66 | 34 | 14 | 45 | 12 |

EXAMPLE VI

The acid used in this example is the same as that used in Example IV. 9.18 grams per minute of acid, 13.1 grams per minute of methanol and 0.162 grams per minute of anhydrous ammonia were continuously fed into an enclosed and stirred reactor filled with previously prepared reaction mixture. These proportions of input materials maintained within the reactor the mole ratio $NH_3:P_2O_5$ of 0.28 and the weight ratio $CH_3OH:P_2O_5$ of 2.7. The temperature of the reaction mixture was maintained at 55°C and the residence time within the reactor was 58 minutes. Overflow from the reactor was collected in an enclosed and stirred sample collector which was maintained at a temperature of 55°C. After each successive period of 44 minutes, the contents of the sample collector were completely expelled so that the average residence time of the reaction mixture within the sample collector was 22 minutes. The total residence time of the reaction mixture at the reaction temperature of 55°C thus was 80 minutes. After the process was operated for 310 minutes, the filtration rate of 980 grams of the reaction mixture was measured at a temperature of 55°C and at 15 inches of Hg on a 10.1-in² filter equipped with 400 mesh Saran filter cloth. The filtration rate was found to be 294 gal/(hr)(ft²). The filter cake was washed with 200 ml of methanol and upon drying was found to weigh 26.3 grams. Upon analysis the dry filter cake was found to have the following weight percent composition:

| $P_2O_5$ | N | Fe | Al | Mg | F |
|---|---|---|---|---|---|
| 48.5 | 4.7 | 6.8 | 5.1 | 1.0 | 6.0 |

Upon analysis the combined filtrate and wash was found to contain 199 grams of $P_2O_5$ and to contain the following amounts of impurities:

| | Grams per kilogram $P_2O_5$ | | | |
|---|---|---|---|---|
| N | Fe | Al | Mg | F |
| 19 | 6.3 | 2.3 | 1.8 | 1.4 |

Based on the total recovery, the percent of input components contained in the combined filtrate and wash are as follows:

| $P_2O_5$ | N | Fe | Al | Mg | F |
|---|---|---|---|---|---|
| 93.6 | 75 | 41 | 25 | 58 | 15 |

EXAMPLE VII

The acid used in this example is the same as that used in Example IV. 10.7 grams per minute of acid, 16.6 grams per minute of methanol and 0.192 grams per minute of anhydrous ammonia were continuously fed into an enclosed and stirred reactor filled with previously prepared reaction mixture. These proportions of input materials maintained within the reactor the mole ratio $NH_3:P_2O_5$ of 0.28 and the weight ratio $CH_3OH$ of 2.9. The temperature of the reaction mixture was maintained at 55°C and the residence time within the reactor was 32 minutes. Overflow from the reactor was collected in an enclosed and stirred sample collector which was maintained at a temperature of 55°C. After each successive period of 40 minutes, the contents of the sample collector were completely expelled so that the average residence time of the reaction mixture within the sample collector was 20 minutes. The total residence time of the reaction mixture at the reaction temperature of 55°C thus was 52 minutes. After the process was operated for 231 minutes, the filtration rate of 1024 grams of the reaction mixture was measured at a temperature of 55°C and at 15 inches of Hg on a 10.1-in² filter equipped with 400 mesh Saran filter cloth. The filtration rate was found to be 173 gal/(hr)(ft²). The filter cake was washed with 200 ml of methanol and upon drying was found to weigh 32.7 grams. Upon analysis the dry filter cake was found to have the following weight percent composition:

| $P_2O_5$ | N | Fe | Al | Mg | F |
|---|---|---|---|---|---|
| 46.9 | 5.1 | 7.4 | 4.9 | 1.0 | 5.9 |

Upon analysis the combined filtrate and wash was found to contain 195 grams of $P_2O_5$ and to contain the following amounts of impurities:

| | Grams per kilogram $P_2O_5$ | | | |
|---|---|---|---|---|
| N | Fe | Al | Mg | F |
| 22 | 5.1 | 1.4 | 1.7 | 1.6 |

Based on the total recovery, the percent of input components contained in the combined filtrate and wash are as follows:

| $P_2O_5$ | N | Fe | Al | Mg | F |
|---|---|---|---|---|---|
| 92.7 | 72 | 30 | 13 | 51 | 14 |

EXAMPLE VIII

Merchant grade wet-process acid containing 54.1 percent by weight of $P_2O_5$ and containing the following amounts of impurities was used in this example:

| | Grams per kilogram $P_2O_5$ | | |
|---|---|---|---|
| Fe | Al | Mg | F |
| 20.3 | 13.3 | 3.33 | 16.6 |

131.2 grams of the acid were charged into a reactor equipped with a stirrer and a reflux condenser. Next 2.55 grams of anhydrous ammonia were added to the stirred acid. Then 196 grams of methanol were dripped into the stirred, ammoniated acid. These proportions of input materials correspond to the mole ratio $NH_3:P_2O_5$ of 0.30 and the weight ratio methanol:$P_2O_5$ of 2.76. The stirred reaction mixture then was digested at the reflux temperature for 30 minutes after which the reaction mixture was filtered under vacuum on a Buchner funnel and the filter cake was washed with 200 ml of methanol. Upon analysis, the combined filtrate and wash was found to contain 63.2 grams of $P_2O_5$ and the following amounts of impurities:

| | Grams per kilogram $P_2O_5$ | | | |
|---|---|---|---|---|
| N | Fe | Al | Mg | F |
| 19 | 1.3 | 0.6 | 0.66 | 1.5 |

The dry filter cake weighed 16.6 grams and upon analysis by official AOAC procedures it was found to have the following weight percent composition:

| P₂O₅ | | N | Fe | Al | Mg | F |
|---|---|---|---|---|---|---|
| Total | Available | | | | | |
| 47.0 | 47.0 | 4.9 | 3.6 | 3.5 | 1.1 | 6.0 |

Based on the total recovery, the percent of input components contained in the combined filtrate and wash are as follows:

| P₂O₅ | N | Fe | Al | Mg | F |
|---|---|---|---|---|---|
| 89 | 60 | 12 | 6 | 18 | 9 |

EXAMPLE IX

The merchant-grade wet-process acid used in Example VIII was also used in this example. 131.2 grams of the acid were charged into a reactor equipped with a stirrer and a reflux condenser. Next 3.24 grams of anhydrous ammonia were added to the stirred acid. Then 294 grams of methanol were dripped into the stirred, ammoniated acid. These proportions of input materials correspond to the mole ratio $NH_3:P_2O_5$ of 0.38 and the weight ratio methanol:$P_2O_5$ of 4.14. The stirred reaction mixture then was digested at the reflux temperature for 30 minutes after which the reaction mixture was filtered under vacuum on a Buchner funnel and the filter cake was washed with 200 ml of methanol. Upon analysis, the combined filtrate and wash was found to contain 61.1 grams of $P_2O_5$ and the following amounts of impurities:

| Grams per kilogram P₂O₅ | | | | |
|---|---|---|---|---|
| N | Fe | Al | Mg | F |
| 26 | 0.5 | 0.3 | 0.5 | 1.0 |

The dry filter cake weighed 20.4 grams and upon analysis by official AOAC procedures it was found to have the following weight percent composition:

| P₂O₅ | | N | Fe | Al | Mg | F |
|---|---|---|---|---|---|---|
| Total | Available | | | | | |
| 48.8 | 48.7 | 5.7 | 6.6 | 4.3 | 0.8 | 4.8 |

Based on the total recovery, the percents of input components contained in the combined filtrate and wash are as follows:

| P₂O₅ | N | Fe | Al | Mg | F |
|---|---|---|---|---|---|
| 86 | 58 | 2 | 2 | 16 | 6 |

EXAMPLE X

The merchant grade wet-process acid used in Example VIII was also used in this example. 131.2 grams of the acid were charged into a reactor equipped with a stirrer and a reflux condenser. Next 0.85 grams of anhydrous ammonia were added to the stirred acid. Then 196 grams of methanol were dripped into the stirred, ammoniated acid. These proportions of input materials correspond to the mole ratio $NH_3:P_2O_5$ of 0.10 and weight ratio of $CH_3OH:P_2O_5$ of 2.76. The stirred reaction mixture then was digested at the reflux temperature for 30 minutes after which the reaction mixture was filtered under vacuum on a Buchner funnel and the filter cake was washed with 200 ml of methanol. Upon analysis, the combined filtrate and wash was found to contain 69.6 grams of $P_2O_5$ and the following amounts of impurities:

| | Grams per kilogram P₂O₅ | | | |
|---|---|---|---|---|
| N | Fe | Al | Mg | F |
| 8 | 16 | 7 | 0.6 | 4.4 |

The dry filter cake weighed 4.29 grams and upon analysis it was found to have the following weight percent composition:

| P₂O₅ | N | Fe | Al | Mg | F |
|---|---|---|---|---|---|
| 33.1 | 2.8 | 6.7 | 9.9 | 4.1 | 17.0 |

Based on the total recovery, the percents of input components contained in the combined filtrate and wash are as follows:

| P₂O₅ | N | Fe | Al | Mg | F |
|---|---|---|---|---|---|
| 98 | 82 | 80 | 53 | 19 | 30 |

EXAMPLE XI

The merchant grade wet-process phosphoric acid used in Example I was also used in this example. A feed stock was prepared by reacting the acid with ammonium bicarbonate to obtain an ammoniated acid having the mole ratio $NH_3:p_2O_5$ of 0.350 and containing 50.7 percent $P_2O_5$. 3.55 grams per minute of the ammoniated acid and 5.72 grams per minute of methanol were continuously fed into an enclosed and stirred reactor filled with previously prepared reaction mixture. This proportion of input materials maintained within the reactor the weight ratio methanol:$P_2O_5$ of 3.18. The temperature of the reaction mixture was maintained at 60°C and the residence time of the reaction mixture within the reactor was 32 minutes. Overflow from the reactor was collected in an enclosed and stirred sample collector which was maintained at a temperature of 60°C. After each successive period of 40 minutes, the contents of the sample collector were completely expelled so that the average residence time of the reaction mixture within the sample collector was 20 minutes. The total residence time of the reaction mixture at the reaction temperature of 60°C thus was 52 minutes.

After the process was operated for 113 minutes, samples of reaction mixture expelled from the sample collector were filtered. Filtrates from 4 samples were combined and then divided into two portions. To separate the methanol from the acid, one portion of filtrate was distilled at atmospheric pressure and the other portion of filtrate was distilled at 0.07 atmospheric pressure. Both distillations were continued until the temperature of the residue rose to 200°C. The results from the analysis of the acid residues are as follows:

| Distillation pressure, atm. | Composition, wt.% | | | | | | Grams per kilogram $P_2O_5$ | | | | |
|---|---|---|---|---|---|---|---|---|---|---|---|
| | $P_2O_5$ | N | Fe | Al | Mg | F | N | Fe | Al | Mg | F |
| 1 | 62.6 | 1.83 | 0.1 | 0.04 | 0.10 | 0.04 | 29 | 1.6 | 0.6 | 1.6 | 0.6 |
| 0.07 | 69.1 | 2.0 | 0.11 | 0.04 | 0.11 | 0.04 | 29 | 1.6 | 0.6 | 1.6 | 0.6 |

EXAMPLE XII

A composite of four samples of the ammonium metallic phosphates and fluorine compounds produced by the continuous precipitation of the impurities from wet-process phosphoric acid with ammonia and methanol was submitted for analysis by official AOAC procedures. The results follow:

| Total | $P_2O_5$, wt.% Available | Water soluble |
|---|---|---|
| 46.9 | 46.9 | 23.3 |

Discussion of Examples

Process Variables

The first seven examples illustrate the continuous operation of the process and the next three examples illustrate batchwise operation. The first three examples show that the effect of increase in the amounts of ammonia and methanol is to increase the degree of purification and to decrease the rate of filtration. Comparison of examples IV and VII shows that the effect of increase in temperature is to increase the rate of filtration. Comparison of examples V, VI, and VII shows that the effect of increase in total residence time is to increase the rate of filtration. Examples IV through VII show that the lower limits of mole ratio $NH_3:P_2O_5$ and weight ratio methanol:$P_2O_5$ that will precipitate more than about 55 percent of the iron and about 70 percent of the aluminum and fluorine from typical wet-process phosphoric acid are about 0.26 and 2.5, respectively. Examples III and IX show that more than about 95 percent of the iron and aluminum and about 83 percent of the fluorine are precipitated from typical wet-process phosphoric acid at mole ratio $NH_3:P_2O_5$ of 0.40 and weight ratio methanol:$P_2O_5$ of 4.2. Example X shows that the degree of purification is very low at a mole ratio $NH_3:P_2O_5$ below the effective range of our process but within the effective range of the process described by German Pat. No. 2,050,008. Example XI shows typical compositions of product acid after distillation of the methanol. Example XII shows that the impurities are precipitated as phosphate containing compounds that are suitable for use as fertilizers.

After careful consideration of the results from the tests presented in the above examples as well as from numerous other tests, the conclusion was reached that the following ranges of process variables are effective in removing more than 55 percent of the major impurities from wet-process Phosphoric acid: (1) mole ratio $NH_3:P_2O_5$ from 0.26 to 0.40, (2) weight ratio methanol:$P_2O_5$ from 2.5 to 4.2, (3) total residence time at the reaction temperature from 15 to 90 minutes, and (4) temperature from 35°C to the boiling point of the reaction mixture. (Boiling point of typical reaction mixtures varies from about 68°C to about 72°C.)

However, the preferred ranges of these variables are as follows: (1) mole ratio $NH_3:P_2O_5$ from 0.30 to 0.38, (2) weight ratio methanol:$P_2O_5$ from 2.8 to 4.0, (3) total residence time from 30 to 90 minutes, and (4) temperature from 55°C to the boiling point of the reaction mixture. Within the preferred ranges, the process can be operated to obtain a high degree of purification but with relatively low filtration rates or it can be operated to obtain somewhat lower degrees of purification but with rapid filtration rates. In industrial practice of the process, a compromise between purification level and filtration rate will be reached that is based on filtration costs as well as on the desired purification level.

What is claimed is:

1. The improved method for the partial purification of crude phosphoric acid prepared from phosphate rock and sulfuric acid and containing 50 to 55 percent $P_2O_5$ with co-production of solid fertilizer material, said solid fertilizer material containing 44–55 % $P_2O_5$ and 4–7% nitrogen and containing the substantial portion of the metallic and fluorine impurities originally present in the crude phosphoric acid, which improved method consists essentially of the steps of:
    1. mixing said crude acid with methanol and ammonia while maintaining the temperature of the resulting mixture between 35°C and the boiling point for a period of time from 15 minutes to 90 minutes, wherein the mole ratio $NH_3:P_2O_5$ of said mixture is maintained from 0.26 to 0.40 and the weight ratio methanol:$P_2O_5$ of said mixture is maintained from 2.5 to 4.2;
    2. subsequently separating the reaction mixture into a clarified liquid fraction consisting of aqueous phosphoric acid and ammonium phosphate dissolved in methanol and a solid fraction containing 44–55% $P_2O_5$ and 4–7% nitrogen and containing the major portion of the metallic and fluorine compounds originally present in the crude phosphoric acid;
    3. subsequently separating the methanol from said clarified liquid fraction to obtain partially purified concentrated phosphoric acid;
    4. subsequently removing phosphoric acid adhering to said solid fraction by washing with methanol and then evaporating methanol from washed solids to recover said solid fertilizer material.

2. A method according to claim 1 wherein the mole ratio $NH_3:P_2O_5$ of said mixture is maintained from 0.30 to 0.38 and the weight ratio methanol:$P_2O_5$ of said mixture is maintained from 2.8 to 4.0.

3. A method according to claim 1 wherein the temperature of said mixture is maintained from 45°C to the boiling point.

4. A method according to claim 1 wherein the temperature of said mixture is maintained from 55°C to the boiling point.

5. A method according to claim 1 wherein the residence time is from 30 minutes to 90 minutes.

6. A method according to claim 1 wherein the residence time is from 45 minutes to 90 minutes.

7. A method according to claim 1 wherein the ammonia is supplied as anhydrous ammonia.

* * * * *